Sept. 15, 1964 A. B. BROERMAN 3,148,532

TEMPERATURE CONTROL SYSTEM

Filed Oct. 1, 1962

INVENTOR.
A.B. BROERMAN

BY Young & Quigg

ATTORNEYS

United States Patent Office
3,148,532
Patented Sept. 15, 1964

3,148,532

TEMPERATURE CONTROL SYSTEM

Arthur B. Broerman, Bartlesville, Okla., assignor to Phillips Petroleum Company, a corporation of Delaware Filed Oct. 1, 1962, Ser. No. 227,155
3 Claims. (Cl. 73—23.1)

Figure 1:
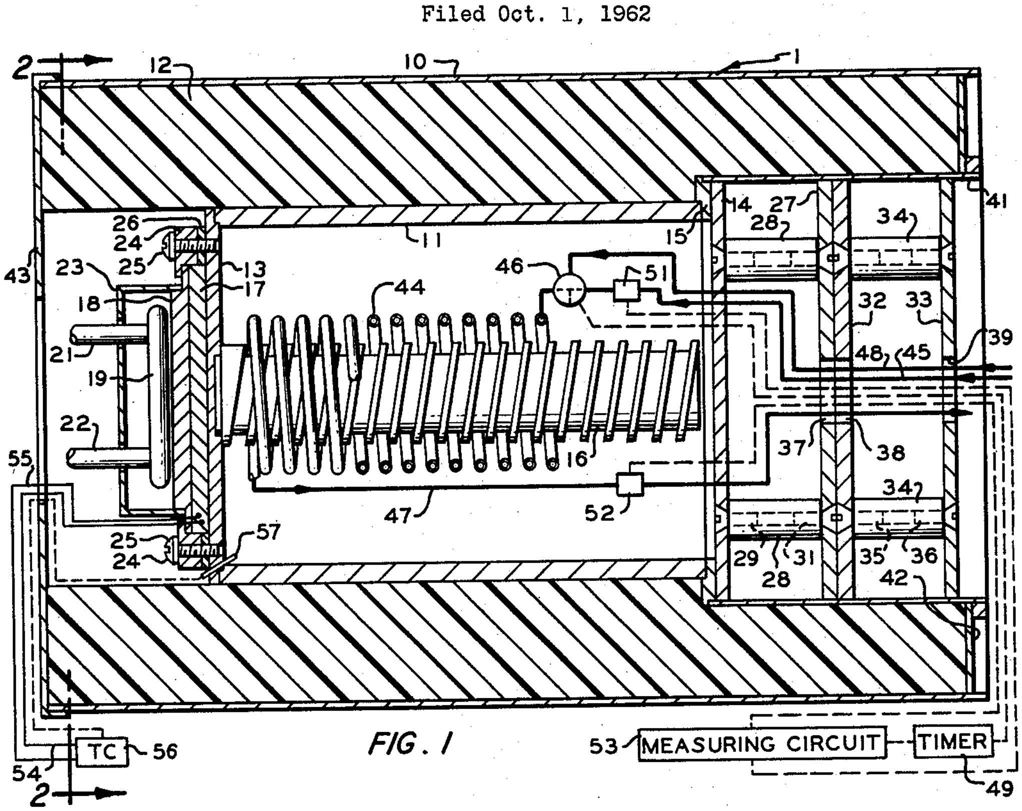

This invention relates to method and apparatus for controlling the temperature of a system. In one aspect the invention relates to a chromatographic analysis system adapted to operate at reduced temperatures. In yet another aspect the invention relates to method and apparatus for regulating the temperature in an instrument housing. In a still further aspect the invention relates to method and apparatus for controlling the temperature of an analyzer system within the range of ambient temperature.

A standard practice for controlling the operating temperature of laboratory and automatic on-stream instruments is to thermostat the instrument at a sufficiently high temperature, such as 150° F., so that some supplementary heat must be added by the control system at the highest ambient temperature. Additional amounts of supplemental heat must be added by the control system at lower ambient temperatures.

However, many instruments, such as the chromatographic analyzer, operate at significantly increased efficiency at lower temperatures, such as in the range of —40° F. to 140° F. Complications arise, however, when the desired operating temperature of the instrument is within the normal range of ambient temperature, for example in the range of 70° F. to about 110° F. One of these complications is that part of the time there is a need for supplemental heat to be added to the system and part of the time there is a need for heat to be removed from the system.

In accordance with the present invention it has now been discovered that the disadvantages of the prior art can be eliminated and the instruments can be operated at greater efficiency within the normal range of ambient temperatures through the utilization of a thermoelectric device.

A thermoelectric device, in its simplest form, comprises a source of D.C. power which forces a current through a series of junctions of dissimilar thermoelectric materials. When two materials of dissimilar thermoelectric properties are joined and a direct current is passed therethrough, the junction becomes either hot or cold depending upon the direction of the electrical current flowing through the junction. This phenomenon is known as the Peltier effect and exists in all junctions of dissimilar materials to some extent. Some materials or alloys, due to a combination of thermal and electrical properties, produce an effect that is many times the magnitude of others and these materials or alloys are called thermoelectric materials. For example, thermal junctions, formed between certain alloys of lead, bismuth, or antimony combined in varying quantities with tellurium or selenium and having slight amounts of impurities, such as silver, gold or sulfur, have exhibited heating and cooling properties of a magnitude that can be usefully applied to the fields of air conditioning and refrigeration. The junctions either absorb heat or generate heat and are arranged so that all like junctions are arranged in one zone, i.e., the cold producing junctions are placed in one zone and the heat generating junctions are placed in a second zone. A reversal of the direction of the flow of current reverses the function of the junctions in each zone.

Accordingly, it is an object of the invention to provide an improved temperature control system. Another object of the invention is to increase the efficiency of operation of various instruments. Yet another object of the invention is to provide for an improved chromatographic analysis system. A still further object of the invention is to provide a control system for regulating a temperature within the normal range of ambient temperatures. Another object of the invention is to provide improved method and apparatus for regulating temperature within an instrument housing.

Other aspects, objects and advantages of the invention will be apparent from a study of the disclosure, the drawings and the appended claims to the invention.

Figure 2:
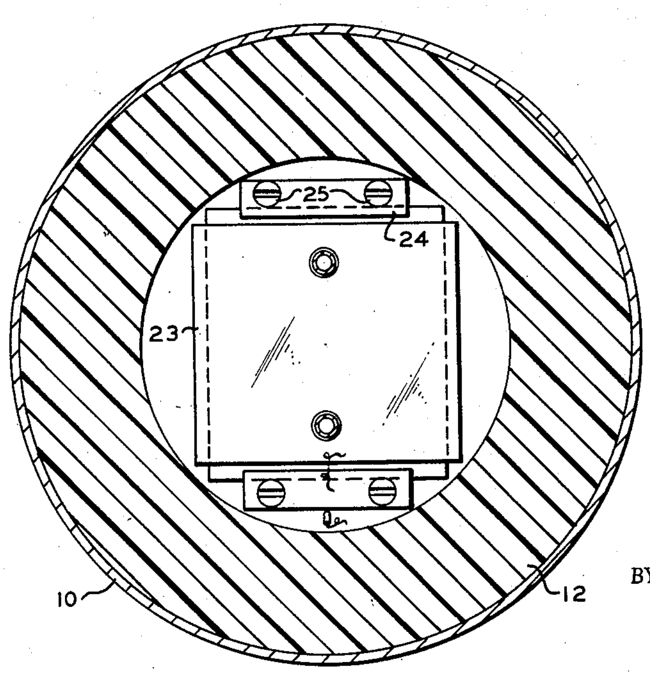

In the drawings FIGURE 1 is a schematic representation of a temperature control system in accordance with the invention, with the temperature controlled housing being shown in cross section; and FIGURE 2 is an end view of the housing of FIGURE 1 taken along the line 2—2.

Referring now to the drawings and to FIGURE 1 in particular there is shown a housing 1 comprising an outer cylindrical wall 10 and an inner cylindrical wall 11. The annular space between walls 10 and 11 can be filled with a suitable insulating material 12, such as polyurethane foam. One end of cylindrical wall 11 is sealed by means of a plate 13. Wall 11 and plate 13 are suitable heat conducting materials, such as aluminum or stainless steel. Plate 13 can be secured to cylindrical wall 11 by any suitable means such as by the utilization of bolts or by welding. The opposite end of cylindrical wall 11 is closed by a removable plate 14, which is preferably of a suitable heat conducting material. A sealing ring 15, which is made of a suitable material such as Synthane, can be positioned between cylindrical wall 11 and plate 14 to provide a substantially air tight seal. A cylindrical bar 16 is mounted within cylindrical wall 11 with one end of bar 16 being attached to plate 13. Bar 16 is preferably positioned coaxially with respect to cylindrical wall 11. The exterior surface of bar 16 and the inner surface of cylindrical wall 11 are preferably treated, such as by threading or sandblasting, to increase the surface area thereof to provide a rapid and uniform distribution of heat. A module 17 of thermoelectric devices is positioned with one surface thereof in heat exchanging relationship with plate 13. A plate 18 of suitable heat conducting material, for example copper, is placed in heat exchanging relationship with the opposite surface of module 17. A fluid indirect heat exchanging coil 19 having an inlet conduit 21 and an outlet conduit 22 is positioned adjacent to and in heat exchanging relationship with plate 18. Coil 19, plate 18, module 17 and plate 13 are maintained in firm contact with one another by means of a cover 23 which is secured to plate 13 by a suitable means, for example latching lugs 24 and bolts 25. A sealing member 26 of a suitable material, such as Synthane, is preferably positioned between latching lug 24 and plate 13 to give substantially air tight seals around the openings for bolts 25.

Plate 27 is spaced from plate 14 by means of a plurality of spacers 28, the respective ends of which are secured to plates 14 and 27 by suitable means such as screws 29 and 31, respectively. A plate 32 is positioned adjacent plate 27 and is spaced from a plate 33 by means of a plurality of spacers 34 the respective ends of which are secured to plates 32 and 33 by means of screws 35 and 36, respectively. Plates 27, 32 and 33 have openings 37, 38 and 39, respectively, to permit the passage therethrough of conduits and electrical wires. Plates 14 and 27 and plates 32 and 33 are removably positioned within a cylindrical cavity formed by cylindrical wall 41. Thus plates 14 and 27 in combination with cylindrical wall 41 and plates 32 and 33 in combination with cylindrical wall 41 form first and second insulating spaces which are preferably filled with a suitable insulating material such as polyurethane foam (not shown in the drawing for the sake of clarity). The insulating material can be introduced into the insulating spaces after the conduits and electrical wiring have been installed. Cylindrical wall 41 can be held in place by means of an annulus 42 which is secured to outer cylindrical wall 10 adjacent one end thereof. The other end of cylindrical wall 12 is provided with a cover plate 43 through which conduits 21 and 22 extend. Cover plate 43 is secured to cylindrical wall 10 by any suitable means, for example by threads.

Positioned within cylindrical wall 11 and surrounding a portion of bar 16 is a conventional chromatographic column 44 which is filled with a packing material or sorbent that selectively retards passage therethrough of constituents of a fluid to be analyzed. A carrier gas is introduced into the inlet of column 44 by way of a conduit 45 and sample valve 46. The effluent from column 44 is withdrawn from housing 1 by way of a conduit 47. A sample conduit 48 communicates with a sample inlet of sampling valve 46. Valve 46 is opened periodically for a preselected time interval by means of a timer 49 so as to introduce a predetermined volume of fluid sample from conduit 48 into column 44. Although shown schematically valve 46 can be any type of sampling valve known in the art which permits the introduction of a predetermined amount of fluid sample.

First and second sensing elements 51 and 52 are disposed in conduits 45 and 47, respectively. These sensing elements are adapted to compare a property of the fluid flowing through conduit 45 with a property of the fluid flowing through conduit 47 to provide an indication of the difference therebetween. These sensing elements are advantageously temperature sensitive resistance elements. The sensing elements 51 and 52 are connected into a measuring circuit 53 which can be any suitable measuring circuit known in the art. Before the sample fluid is introduced into column 44 carrier gas flows though conduits 45 and 47 so that elements 51 and 52 respond to the same fluid and have identical outputs. Valve 46 is then actuated to introduce a predetermined volume of sample into column 44 and thereafter actuated to pass carrier gas from conduit 45 into conduit 44. The carrier gas removes the constituents of sample from the column in sequence so that element 52 responds sequentially to these individual constituents. Conduits 45, 47 and 48 as well as the input line to valve 46 and the output lines of sensing elements 51 and 52 are preferably passed through individual openings in end plate 14 so as to reduce the possibility of heat leakage. Conduits 45, 47 and 48 and the control lines pass through openings 37, 38 and 39 in plates 27, 32 and 33, respectively. As previously noted the space between plates 14 and 27 and the space between plates 32 and 33 is preferably filled with an insulating material after the conduits and control lines have been installed.

All of the components within cylindrical wall 11 are maintained substantially at the same temperature by the passage of an electrical current through the thermoelectric device in module 17 by way of lines 54 and 55. The flow of electric current through lines 54 and 55 is regulated by temperature controller 56 responsive to the temperature within the enclosure formed by cylindrical wall 11 as indicated by temperature sensing element 57. If desired temperature sensing element 57 can be positioned adjacent column 44, or any other desired object, to determine and control the temperature thereof. The thermoelectric device in module 17 is positioned with the cooling junctions adjacent plate 13 and the heating junctions adjacent plate 18. Thus heat is removed from the enclosure formed by cylindrical wall 11 by means of the absorption of heat by cylindrical wall 11, bar 16 and plates 13 and 14 with the subsequent transfer of the absorbed heat to the cold side of module 17. The heat is transmitted through module 17 by means of the Peltier effect and through plate 18 into the fluid passing through heat exchange coil 19. When it is desired to increase the temperature within the enclosure formed by cylindrical wall 11, the flow of current through module 17 can be reduced, or even reversed. In the latter event the junctions of the thermoelectric device adjacent plate 13 would change from cold junctions to hot junctions while the junctions adjacent plate 18 would change from hot junctions to cold junctions, thus effecting a transfer of heat from the fluid medium in coil 19 into the enclosure formed by wall 11. The enclosure formed by wall 11 can be filled with a suitable fluid heat transferring medium such as air. If desired cover 23 can be made to form a fluid tight enclosure in combination with plate 18, and coil 19 can be omitted while retaining inlet and outlet conduits 21 and 22. In those instances where it is desired to utilize air as the medium for removing heat from plate 18, plate 18 can be provided with a suitable means for increasing the surface area thereof, such as one or more fins, or the surface of plate 18 can be sandblasted.

In a specific device which has been successfully operated, wall 11 has a diameter of 5½ inches and a length of 5 inches. Wall 11 and plates 13 and 14 are aluminum of approximately ½ inch thickness. Bar 16 has a diameter of approximately 2¼ inches and extends the full length of wall 11, with one end of bar 16 being joined to plate 13 and the other end making contact with plate 14. Column 44 is wound in helical form and placed around bar 16. As many as four columns can be placed in the temperature-controlled enclosure, depending upon the size of the columns. The side of plate 13 adjacent module 17 is finished to a very flat surface and module 17 is placed on this surface with a one mil Teflon film as an insulator. Plate 18 is a copper plate having a thickness of ¼ inch and is insulated from module 17 by a one mil Teflon film. Coil 19 is copper tubing and is silver brazed onto plate 18. A heavy silicone oil is used to wet both sides of the Teflon films to prevent air film areas. Module 17 is a model MC7–32 manufactured by Materials Electronics Products Corp., of Trenton, New Jersey, and has a 64 watt capacity. Water is circulated through coil 19 and then through a refrigeration condenser coil as desired. Sensing element 57 is a thermistor probe positioned adjacent the inner wall of plate 13. The thermistor constitutes one arm of a bridge circuit in temperature controller 56. Over and under control of the temperature is accomplished by actuating a switch to reverse the polarity of the current being passed through module 17 responsive to whether the temperature indicated by thermistor 57 is above or below a set point.

While the invention has been illustrated in combination with a chromatographic analysis system, it is within the contemplation of the invention to control the temperature in other instrument housings, for example, refractometer, capacitance measuring devices, gravitometers and the like.

While the invention has been described in terms of a cylindrical housing having cylindrical walls 10 and 11 and a cylindrical bar 16, it is within the contemplation of the invention to utilize any suitable configuration. Similarly, spaces 28 and 34 and plates 27, 32 and 33 can be replaced by any suitable insulating means while permitting the passage into the enclosure formed by wall 11 of the conduits and control lines.

Reasonable variation and modification are possible within the scope of the foregoing disclosure, the drawing and the appended claims to the invention.

I claim:

1. A chromatographic analyzer comprising a hollow cylindrical member of heat conducting material having first and second open ends, heat insulating means surrounding said cylindrical member, a first end member of heat conducting material secured to said cylindrical member over said first open end, a second end member of heat conducting material secured to said cylindrical member over said second open end, a cylindrical bar of heat conducting material having a cross-sectional area less than the inner cross-sectional area of said cylindrical member, said bar being positioned within said cylindrical member and substantially coaxial therewith, one end of said bar being secured to said first end member, a Peltier effect thermoelectric device having a first side and a second side, said second side being positioned in heat exchanging relationship with said first end member, means for passing a fluid in heat exchanging relationship with said first side of said thermoelectric device, a conduit filled with sorbent and positioned within said cylindrical member, said conduit having an inlet and an outlet, means for introducing a discrete amount of sample into said conduit through said inlet at predetermined times, means for passing a carrier gas through said conduit by way of said inlet, means for determining a property of the effluent from said conduit, means for passing an electrical current through said thermoelectric device, means for determining the temperature of said conduit, means responsive to said means for determining for controlling the amount and direction of current which is passed through said thermoelectric device.

2. A temperature controlled chromatographic analyzer comprising a hollow member of heat conducting material having first and second open ends, heat insulating means surrounding said hollow member, a first end member of heat conducting material secured to said hollow member over said first open end, a second end member of heat conducting material secured to said hollow member over said second open end, an inner member of heat conducting material having a cross-sectional area less than the cross-sectional area of said hollow member, said inner member being positioned within said hollow member and substantially coaxial therewith, one end of said inner member being secured to said first end member, a Peltier effect thermoelectric device having a first side and a second side, said second side being positioned in heat exchanging relationship with said first end member, means for passing a fluid in heat exchanging relationship with said first side of said thermoelectric device, a chromatographic column positioned within said hollow member, means for introducing a sample into said chromatographic column, means operatively associated with said chromatographic column for producing a signal representative of a property of said sample, means for passing an electrical current through said thermoelectric device, means for determining the temperature of said chromatographic column, means responsive to said means for determining for controlling the amount and direction of current which is passed through said thermoelectric device.

3. A chromatographic analyzer comprising a hollow cylindrical member of heat conducting material having first and second open ends, heat insulating means surrounding said cylindrical member, a first end member of heat conducting material secured to said cylindrical member over said first open end, a second end member of heat conducting material secured to said cylindrical member over said second open end, a cylindrical bar of heat conducting material having a cross-sectional area less than the inner cross-sectional area of said cylindrical member, said bar being positioned within said cylindrical member and substantially coaxial therewith, the exterior surface of said bar being threaded to increase the surface area of said bar, one end of said bar being secured to said first end member, a Peltier effect thermoelectric device having a first side and a second side, said second side being positioned in heat exchanging relationship with said first end member, means for passing a fluid in heat exchanging relationship with said first side of said thermoelectric device, a conduit filled with sorbent and shaped in the form of a helix, said conduit being positioned within said cylindrical member and surrounding a portion of said bar, said conduit having an inlet and an outlet, means for introducing a discrete amount of sample into said conduit through said inlet at predetermined times, means for passing a carrier gas through said conduit by way of said inlet, means for determining a property of the effluent from said conduit, means for passing an electrical current through said thermoelectric device, means for determining the temperature of said conduit, means responsive to said means for determining for controlling the amount and direction of current which is passed through said thermoelectric device.

References Cited in the file of this patent

UNITED STATES PATENTS 2,991,628 Tuck ------------------- July 11, 1961

OTHER REFERENCES

Ashbury Analytical Chemistry, June 1957, vol. 29, No. 6, pages 918–925.

Danielson: Refrigeration Engineering, February 1959, pages 30–33.